United States Patent [19]
Goodwin et al.

[11] 3,821,333
[45] June 28, 1974

[54] GASKET FOR LENS MOLD FROM A BLEND OF EPDM AND ETHYLENE/VINYL ACETATE COPOLYMER

[75] Inventors: Bertram R. Goodwin, Feeding Hills; Don H. Rotenberg, Westboro, both of Mass.

[73] Assignee: American Optical Corporation, Southbridge, Mass.

[22] Filed: Mar. 21, 1973

[21] Appl. No.: 343,615

[52] U.S. Cl. ............... 260/897 B, 264/1, 264/219, 264/331
[51] Int. Cl. ............................... C08f 37/18
[58] Field of Search ..................... 260/897

[56] References Cited
UNITED STATES PATENTS
3,361,850  2/1968  Young ............................ 260/897
3,454,676  7/1969  Busse ............................. 260/897
3,562,229  2/1971  Bauer et al. .................... 260/897

*Primary Examiner*—Murray Tillman
*Assistant Examiner*—C. Seccuro
*Attorney, Agent, or Firm*—William C. Nealon; Bernard L. Sweeney

[57] ABSTRACT

A "T" gasket for lens molds, formed of a mixture of ethylene copolymers such as poly(ethylene-vinyl acetate) and poly(ethylene-propylene-diene) with no plasticizers, additives, or release agents required for its use.

10 Claims, 3 Drawing Figures

PATENTED JUN 28 1974 3,821,333

GASKET FOR LENS MOLD FROM A BLEND OF EPDM AND ETHYLENE/VINYL ACETATE COPOLYMER

Various types of synthetic resins (plastic) have been used for some time to make spectacles, instrument lenses, optical filters, and the like. These have, in one form, been cast, molded, or otherwise formed as plastic units. Many plastic lenses are made as concavo-convex discs, and the molds for such plastic lenses are an assembly of a concave disc and a convex disc (both of which form the smooth mold elements) and these are spaced apart by a T-shaped gasket to form a lens of the correct thickness. The discs are held on the spacing gasket by means of a spring loaded clip or assembly arrangement. Liquid plastic precursor is injected between these disc elements. Such an arrangement, when exposed to heat for the proper time, produces the convexo-concavo lens. One effective lens is formed of a polymer produced from allyl diglycol carbonate, sold under the trademark CR-39. A catalyst (usually a peroxide) is added to the liquid monomer before the mixture is injected into the mold assembly.

The two lens elements (discs) are preferably glass or other rigid material, but the gasket must be of a resilient material because of the high shrinkage of the plastic lens during curing. The glass, or other rigid material, has a smooth surface forming a smooth surface on the resultant lenses.

The molding of such lenses, while seemingly simple, is fraught with numerous problems which reduces the yield of acceptable lenses. Many problems are encountered with the glass molds. One particular problem is the maintenance of the proper level of adhesion between the plastic lens and the glass mold surface to establish the optical curve. In order to accomplish this, the gaskets must be resilient, but with presently used gaskets considerable problems have been encountered due to the lack of adhesion between the plastic lens and the resilient gaskets. This lack of adhesion between the gasket and the lens can lead to premature loss of adhesion between the glass mold and the curing lens. Such failure destroys the optical quality of the lens. In addition, inclusions in the presently used gasket material may be absorbed into the liquid monomer which cause defects in the resultant lens and can interfere with the proper adhesion between lens, gasket and molds. Presently used gaskets are expensive to produce (sometimes a two week conditioning is necessary) and it is difficult to produce a usable gasket.

A commonly used gasket material for lens making methods is a plasticized polyvinyl chloride composition. The usual procedure is to produce these gaskets by an injection molding process. Inclusions which may be found in the polyvinyl chloride gasket include coloring materials, stabilizers, fillers for bulk, plasticizers for softening, mold release agents, materials to prevent burning during injections, such as tin, lead or barium compounds, etc. Many of these inclusions can be undesirably absorbed into the lens and can interfere with the adhesion between the gasket, lens and mold.

According to the present invention there is provided an effective gasket for lens molds which is a mixture of polymers without any other inclusions. The mixture of the polymers in the resultant gasket provides significant thermal distortion during a lens cure cycle to accommodate shrinkage of the lens polymer; has good solvent resistance; is heat distortable; and provides necessary strength and register; and provides the proper level of adhesion to the lens. The new material for gaskets is convenient for use and is safely used.

Included among the objects and advantages of the present invention is to provide a lens mold gasket which is easy and convenient to make and use.

Another object of the invention is to provide a lens mold which may be safely and easily manufactured and used.

Still another object of the invention is to provide a gasket for a lens mold produced from a mixture of polymers without plasticizers or any other additives or migratory materials.

Another object of the invention is to provide a gasket material which has the proper level of adhesion between the gasket and the lens.

A further object of the invention is to provide a gasket material for lens molds formed of two thermoplastic elastomers which may be readily and easily mixed and then injection molded.

These and other objects and advantages of the invention may be readily ascertained by referring to the following description and appended illustration in which.

Figure 1:
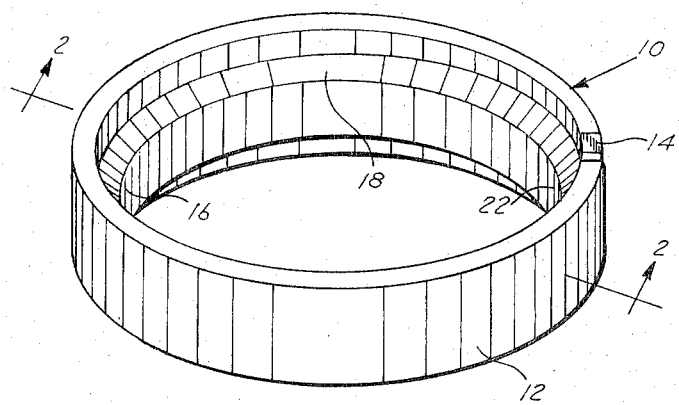
FIG. 1 is a perspective view of a T gasket useful for casting convexo-concavo plastic lenses.
Figure 2:
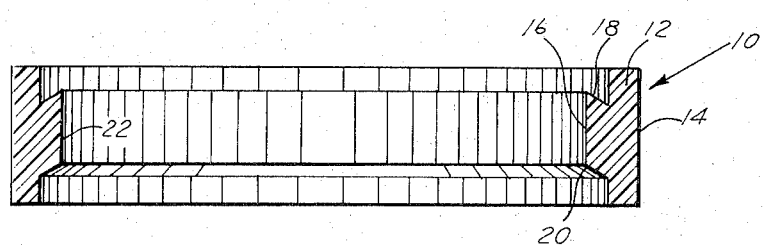
FIG. 2 is a cros-sectional view cross-sectional the gasket of FIG. 1 along section lines 2—2.

The T-shaped gasket selected for illustration in the drawings, and shown in general by numeral 10, includes a peripheral ring 12 which is generally thinner than its axial thickness, and includes a small notch 14. The peripheral ring 12 includes an internal flange 16 having bevelled surfaces 18 and 20 extending from the inner surface 22 of the flange to the ring 12.

Figure 3:
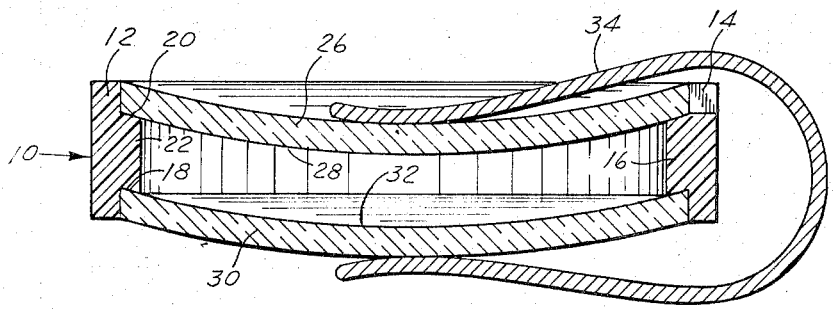
FIG. 3 is a cross-sectional view of the T gasket of FIG. 1 illustrating its use in a lens mold ready for casting a plastic lens.

The T gasket is shown in use in FIG. 3, where a disc mold element 26 with a convex surface 28 is mounted in the gasket with its peripheral surface seated on and abutting the bevelled surface 20 on the internal flange 16. A second disc mold element 30 having a concave surface 32, has its peripheral surface abutting the bevelled edge 18 on an internal flange 16. A spring clamp 34 provides means for holding the unit together while the casting is being performed. The discs are glass, and the gasket is a resilient material. To inject liquid plastic (monomer and catalyst) into the mold, a hypodermic needle is moved through the notch 14 and under the lens element 26. Liquid is then injected into the cavity of the mold. Prior to injecting into the mold cavity, the liquid monomer, usually CR-39, is mixed with a peroxide catalyst and the void in the mold is completely filled to release air bubbles, etc.

A material useful for producing the T-shaped gasket, described above, is solely a blend or mixture of ethylene co- or ter-polymers and possibly polyethylene homopolymer. Some general examples of these useful co- or ter-polymers are poly(ethylene-vinyl acetate), poly(ethylene-ethyl acrylate), poly(ethylene-propylene), and poly(ethylene-propylene-diene). The following is a listing of a number of specific examples of these useful polymers with some of their typical properties.

| Manufacturer's Designation | Grade | Poly(ethylene-vinyl acetate) Weight % vinyl Acetate | Melt Index | Hardness Shore A | Shore D |
|---|---|---|---|---|---|
| DuPont Alathon EVA | 3190 | 24–26 | 2 | 85 | 30 |
| | 3175 | 27–29 | 6 | 83 | 25 |
| | 3185 | 32–34 | 25 | 65 | 17 |

| Manufacturer | Grade | Poly(ethylene-ethyl acrylate) Weight % ethyl acrylate | Melt Index | Hardness Shore A | Shore D |
|---|---|---|---|---|---|
| Union Carbide | DPDA 9169 | Unknown | 20 | 86 | 31 |

| Manufacturer | Grade | Poly(ethylene-propylene) Mooney Viscosity (ML 1 + 8, 212°F) | Estimated weight % ethylene |
|---|---|---|---|
| Exxon Vistalon | 404 | 35–45 | 45–50 |

| Manufacturer | Grade | Poly(ethylene-propylene-diene) Estimated weight % ethylene | Diene | Mooney Viscosity | Shore A Hardness |
|---|---|---|---|---|---|
| Exxon Vistalon | 3708 | 60–65 | ethylene norbonene | (ML 1+8, 260°F) 45–55 | 55 |
| DuPont Nordel | 1500 | 65–70 | 1,4-hexadiene | (ML 2+10, 250°F) 58±6 | 61 |

| Manufacturer | Poly ethylene Grade | Melt Index | Density |
|---|---|---|---|
| Eastman Tenite | 808A | 7.0 | 0.917 |
| | 812A | — | — |
| | 1914 | 22 | 0.923 |
| | 1917 | 30 | 0.923 |

A number of combinations of these polymers were found to be useful for making gaskets for lens casting. These include blends of poly(ethylene-propylene-diene) such as Nordel 1500 with poly(ethylene-vinyl acetate) such as Alathons 3175 and 3190. In addition, useful combinations were found which, also, incorporated polyethylene. These include combinations of Nordel 1500, Alathon 3185, and Tenite 808A and 812A.

One of the most useful combinations is a blend of Alathon 3175 and Nordel 1500. The first polymer is a poly (ethylene-vinyl acetate) sold by the DuPont Company. This particular polymer is derived from the copolymerization of ethylene and vinyl acetate. The Alathon 3175 contains about 28 weight percent of vinyl acetate and has a melt index of about 6. The density of the copolymer is 0.94, and it has a Shore A hardness of 83, a Shore D hardness of 25 and a Vicat softening point of 127° F.

This polymer has a good snap back or resilience, has almost instantaneous elasticity, is flexible and rubber-like, has a low Vicat softening, does not resist compression set, and tends to creep under load at higher temperatures. These copolymers have exceptionally good low temperature properties with brittleness values of less than about −159° F.

The second polymer is, also, sold by the DuPont Company under the name of Nordel 1500, and this is a terpolymer of ethylene, propylene and 1,4-hexadiene. The terpolymer is a cureable elastomer which possesses rather high uncured strength. However, this material is used as an uncured thermoplastic and no curatives are added. The product is produced as a free-flowing pellet which facilitates easy mixing with the pelletized ethylene-vinyl-acetate pellets.

The two polymers are used in a ratio of 25–75 weight percent of poly(ethylene-vinyl-acetate) and 75–25 weight percent of poly(ethylene-propylene-diene). The materials are thermoplastic elastomers formed as pellets, and these pellets are easily mixed together in the proper proportion and used in the injection molding machine. The ethylene-vinyl acetate has a greater room temperature hardness and modulus, and provides the necessary strength and register when the casting cell is assembled and filled. The combined materials tend to provide significant thermal distortion during the cure cycle so that the shrinkage of the lens polymer may be accommodated. The ethylene-propylene-diene polymer produces the necessary adhesion between the polymerizing lens and the gasket. As pointed out above, the composition for the gasket is 100 percent polymer. There are no plasticizers or additives to interfere with and contaminate the casting process and the product.

An excellent mixture for a gasket is formed with 25–50 weight percent of the poly(ethylene-vinyl acetate) and 50–75 weight percent of the poly(ethylenepropylene-hexadiene). This mixture gives sufficient hardness and modulus to provide the necessary strength and register for the casting cell and it, also, provides good adhesion between the polymerizing lens and the gasket. In actual casting of the lenses in quantity, the yield ranges from 85–95 percent of acceptable lenses, depending upon the specific ratio of the two components.

What is claimed is:

1. A gasket for lens molds consisting of a polymer blend comprising from 25–75 weight percent of an ethylene/vinyl acetate copolymer and from 75–25 percent by weight of an ethylene-propylene-diene interpolymer, said gasket being solely of polymerized material, without other additives.

2. A gasket for lens molds according to claim 1 wherein said polymerized material is sufficiently resilient to completely seal the peripheral edge of mounted mold elements therein.

3. A gasket for lens molds according to claim 1 wherein the quantity of ethylene-vinyl acetate copolymer is about 25–50 weight percent and the quantity of ethylene-propylene-diene interpolymer is about 75–50 weight percent.

4. A gasket for lens molds according to claim 1 wherein said gasket is molded to the desired shape for use in a lens mold.

5. A method of forming a gasket for a lens mold comprising intimately mixing from 25–75 weight percent a pelletized thermoplastic ethylene/vinyl acetate copolymer with from 75–25 weight percent of a pelletized thermoplaastic ethylene-propylene-diene interpolymer, injection molding said mixture into the desired shape, and then placing the resultant gasket in lens mold.

6. A method according to claim 5 wherein about 25–50 weight percent of ethylene-vinyl acetate is mixed and molded with about 50–75 weight percent of ethylene-propylene-1,4-hexadiene inter polymer.

7. A gasket for lens molds according to claim 1 wherein the quantity of ethylene-vinyl acetate is about 37.5 weight percent and the quantity of ethylene-propylene-1, 4-hexadiene interpolymer is about 62.5 weight percent.

8. A method of forming a gasket for a lens mold comprising intimately mixing from 25–50 weight percent of a pelletized thermoplastic ethylene-vinyl acetate copolymer with 75–50 weight percent of a pelletized thermoplastic ethylene-propylene-1, 4-hexadiene interpolymer, injection molding said mixture into the desired shape, curing said mixture, and then placing the resultant gasket in lens mold without further treatment.

9. A method according to claim 5 wherein about 37.5 weight percent of ethylene-vinyl acetate is mixed with about 62.5 weight percent of poly(ethylene-propylene-1, 4-hexadiene).

10. A gasket for lens molds according to claim 1 wherein the gasket is a T-shaped lens mold gasket.

* * * * *